United States Patent
Tan et al.

(10) Patent No.: US 7,817,445 B2
(45) Date of Patent: Oct. 19, 2010

(54) COMPUTER POWER SUPPLY

(75) Inventors: Yi-Cai Tan, Shenzhen (CN); Ren-Jun Xiao, Shenzhen (CN); Zhi-Sheng Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 410 days.

(21) Appl. No.: 11/967,082

(22) Filed: Dec. 29, 2007

(65) Prior Publication Data

US 2009/0161397 A1    Jun. 25, 2009

(30) Foreign Application Priority Data

Dec. 19, 2007    (CN)    ......................... 2007 1 0203251

(51) Int. Cl.
H02M 3/335    (2006.01)

(52) U.S. Cl. .............. 363/21.07; 363/21.11; 363/21.12; 363/21.15

(58) Field of Classification Search ................... 363/16, 363/21.04, 21.07, 21.11, 21.12, 21.15, 21.17, 363/21.18, 125, 126, 132; 307/64, 65, 66
See application file for complete search history.

(56) References Cited

U.S. PATENT DOCUMENTS

| | | | | |
|---|---|---|---|---|
| 4,236,198 A | * | 11/1980 | Ohsawa et al. | 363/49 |
| 5,324,999 A | * | 6/1994 | Hunley et al. | 327/553 |
| 5,490,053 A | * | 2/1996 | Tkacenko et al. | 363/15 |
| 7,633,266 B2 | * | 12/2009 | Lu et al. | 320/140 |
| 2008/0186645 A1 | * | 8/2008 | Morimoto et al. | 361/194 |

* cited by examiner

Primary Examiner—Bao Q Vu
Assistant Examiner—Nguyen Tran
(74) Attorney, Agent, or Firm—Frank R. Niranjan

(57) ABSTRACT

A power supply for a computer includes a transformer, a rectifier, a pulse width modulation (PWM) controller, a relay, a power switch, and a battery. The PWM controller includes a voltage terminal and a pulse terminal. The relay includes a switch and an inductance coil. An alternating current (AC) power supply is connected to a primary inductance coil of the transformer via the rectifier. A secondary inductance coil of the transformer provides a standby voltage. A positive voltage terminal of the rectifier is connected to the pulse terminal of the PWM controller via the primary inductance coil of the transformer. The switch is connected between the positive voltage terminal of the rectifier and the voltage terminal of the PWM controller. The inductance coil and the power switch are connected in series between the battery and ground. The power switch is controlled by powering on or off the computer.

12 Claims, 1 Drawing Sheet

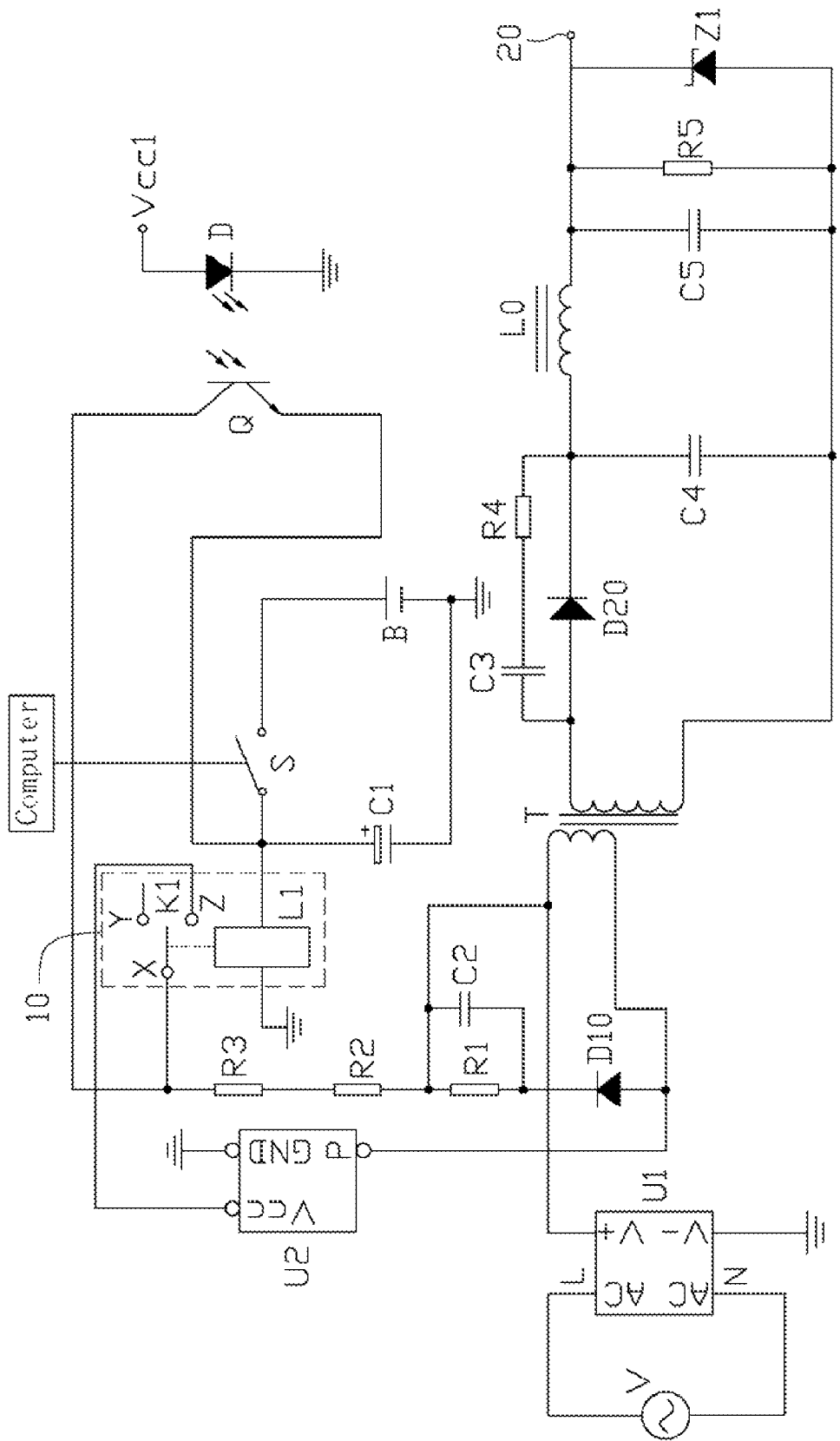

COMPUTER POWER SUPPLY

BACKGROUND

1. Field of the Invention

The present invention relates to a computer power supply.

2. Description of Related Art

In a soft power shut down of a computer, its motherboard sends a control signal to turn off the power supply of the computer. However, at this time, the power supply still outputs a 5V standby voltage, which is a waste of power.

What is desired, therefore, is to provide a computer power supply which automatically shuts off a standby voltage after a soft power shut down of the computer.

SUMMARY

In one embodiment, A power supply for a computer includes a transformer, a rectifier, a pulse width modulation (PWM) controller, a relay, a power switch, and a battery. The PWM controller includes a voltage terminal and a pulse terminal. The relay includes a switch and an inductance coil. An alternating current (AC) power supply is connected to a primary inductance coil of the transformer via the rectifier. A secondary inductance coil of the transformer provides a standby voltage. A positive voltage terminal of the rectifier is connected to the pulse terminal of the PWM controller via the primary inductance coil of the transformer. The switch is connected between the positive voltage terminal of the rectifier and the voltage terminal of the PWM controller. The inductance coil and the power switch are connected in series between the battery and ground. The power switch is controlled by powering on or off the computer.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a computer power supply in accordance with an embodiment of the present invention.

DETAILED DESCRIPTION

Referring to the drawing, a computer power supply in accordance with an embodiment of the present invention includes a voltage source Vcc1 (for example 3.3V), a light emitting diode (LED) D, a photosensitive element Q, a rectifier U1, a battery B, a power switch S, a relay 10, a PWM (Pulse Width Modulation) controller U2, a transformer T, a voltage regulating diode Z, an inductance L0, two diodes D10 and D20, five resistors R1~R5, five capacitors C1~C5, and a voltage output terminal 20. The relay 10 includes a switch K1 and an inductance coil L1. In this embodiment, the switch K1 is a single-pole double-throw (SPDT) switch. The photosensitive element Q is an NPN photosensitive transistor. The capacitor C1 is an electrolytic capacitor.

The voltage source Vcc1 is connected to the anode of the LED D. The cathode of the LED D is grounded. Two AC power terminals of the rectifier U1 are respectively connected to the hot terminal L and the neutral terminal N of an AC power supply V. A negative voltage terminal V− of the rectifier U1 is grounded. A positive voltage terminal V+ of the rectifier U1 is connected to the anode of the diode D10 and a pulse terminal P of the PWM controller U2 via a primary inductance coil of the transformer U2. The cathode of the diode D10 is connected to a pole X of the SPDT switch K1 of the relay 10 and the collector of the photosensitive transistor Q via the resistors R1, R2, R3 connected in series. A throw Z of the SPDT switch K1 of the relay 10 is connected to a voltage terminal Vcc of the PWM controller U2. A ground terminal GND of the PWM controller U2 is grounded. A positive terminal of the battery B is grounded via the power switch S and the inductance coil L1 of the relay 10 connected in series. The negative terminal of the battery B is grounded. The emitter of the photosensitive transistor Q is connected to a node between the power switch S and the inductance coil L1 of the relay 10. The positive terminal of the capacitor C1 is connected to a node between the power switch S and the inductance coil L1 of the relay 10. The negative terminal of the capacitor C1 is grounded. The capacitor C2 and the resistor R1 are connected in parallel. The positive voltage terminal V+ of the rectifier U1 is connected to a node between the resistor R1 and the resistor R2. One end of a secondary inductance coil of the transformer T is connected to the anode of the diode D20, and the other end of the secondary inductance coil of the transformer T is connected to the anode of the voltage regulating diode Z1. The cathode of the diode D20 is connected to the voltage output terminal 20 via the inductance L0. The cathode of the voltage regulating diode Z1 is connected to the voltage output terminal 20. The anode of the diode D20 is connected to the cathode of the diode D20 via the capacitor C3 and the resistor R4 connected in series. The cathode of the diode D20 is connected to the anode of the voltage regulating diode Z1 via the capacitor C4. The capacitor C5, the resistor R5, and the voltage regulating diode Z1 are connected in parallel. The resistors R1~R5 are provided for limiting current. The capacitors C1~C5 and the inductance L0 are filters. The resistors R1~R5, the capacitors C1·C5, and the inductance L0 can be deleted to save on cost.

The computer power supply is installed in a computer, and connected to a motherboard of the computer. When the computer is turned on, the motherboard provides a control signal to the power supply. The power switch S is closed by means of a relay (not shown). The photosensitive transistor Q becomes conductive at receiving light from the LED D. The AC power supply V provides a voltage to the inductance coil L1 of the relay 10 through the photosensitive transistor Q, the voltage does not connect the pole X of the SPDT switch K1 to the throw Z of the SPDT switch K1, thereby, the battery B also provides a voltage to the inductance coil L1 of the relay 10, and connecting the pole X of the SPDT switch K1 to the throw Z of the SPDT switch K1, closes the relay 10. The positive voltage terminal V+ of the rectifier U1 provides voltage to the voltage terminal Vcc of the PWM controller U2 via the relay 10. The pulse terminal P of the PWM controller U2 outputs a pulse signal to the primary inductance coil of the transformer T. The AC power supply V outputs a direct current (DC) voltage to the primary inductance coil of the transformer T via the rectifier U1. The DC voltage is reduced to 5V by the transformer T. Thus, the voltage output terminal 20 outputs a 5V standby voltage.

When the computer is turned off, the motherboard provides a control signal to the power supply. The power switch S is opened. The inductance coil L1 of the relay 10 is not conductive, and the pole X of the SPDT switch K1 is not connected to the throw Z of the SPDT switch K1. The voltage terminal Vcc of the PWM controller U2 receives no voltage, and the pulse terminal P of the PWM controller U2 does not output a pulse signal to the transformer T. Therefore, the transformer T does not work, and the voltage output terminal 20 does not output a 5V standby voltage.

The computer power supply according to voltage of the inductance coil L1 of the relay 10 controls the relay 10 to be turned on or off to control the voltage terminal Vcc of the PWM controller U2. The pulse terminal P of the PWM controller U2 controls the transformer T to control the voltage output terminal 20 to output 5V standby voltage. The computer power supply is simple, and low-cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply for a computer, comprising:
   an alternating current (AC) power supply connected to a primary inductance coil of a transformer via a rectifier, a secondary inductance coil of the transformer providing a standby voltage;
   a pulse width modulation (PWM) controller comprising a voltage terminal, and a pulse terminal,
   a positive voltage terminal of the rectifier connected to the pulse terminal of the PWM controller via the primary inductance coil of the transformer; and
   a relay comprising a switch and an inductance coil, the switch connected between the positive voltage terminal of the rectifier and the voltage terminal of the PWM controller, the inductance coil and a power switch connected in series between a battery and ground;
   wherein the power switch is controlled by powering on or off the computer, when the computer is turned on, the power switch is closed, the battery provides a voltage to the inductance coil of the relay to close the relay, the positive voltage terminal of the rectifier provides voltages to the voltage terminal of the PWM controller via the relay, the pulse terminal of the PWM controller outputs a pulse signal to the primary inductance coil of the transformer to start the transformer, a direct current (DC) voltage is converted from the AC power supply via the rectifier and the transformer, and output to the voltage output terminal; when the computer is turned off, the power switch is opened, the inductance coil of the relay does not receive voltages from the battery and the relay is not conductive, the voltage terminal of the PWM controller receives no voltage, and the pulse terminal of the PWM controller does not output a pulse signal to the transformer and the transformer stop working, the voltage output terminal does not output voltages.

2. The power supply as claimed in claim 1, further comprising:
   a light emitting diode (LED), a voltage source connected to the anode of the LED, the cathode of the LED grounded; and
   a photosensitive element in proximity to and facing the LED, a first terminal of the photosensitive element connected to a first terminal of the switch of the relay that is connected to the positive voltage terminal of the rectifier, a second terminal of the photosensitive element connected to the inductance coil of the relay.

3. The power supply as claimed in claim 2, wherein the photosensitive element is an NPN photosensitive transistor, the first and second terminals of the photosensitive element are connected to the collector and the emitter of the NPN transistor respectively.

4. The power supply as claimed in claim 2, further comprising a first diode, wherein the anode of the first diode is connected to a node between the primary inductance coil of the transformer and the pulse terminal of the PWM controller, the cathode of the first diode is connected to the first terminal of the switch of the relay via a first resistor and a second resistor connected in series.

5. The power supply as claimed in claim 4, further comprising a second capacitor, wherein the first resistor and the second capacitor are connected in parallel.

6. The power supply as claimed in claim 1, wherein the switch of the relay is a single-pole double-throw switch.

7. The power supply as claimed in claim 1, further comprising a first capacitor,
   wherein a positive terminal of the first capacitor is connected to a node between the inductance coil and the power switch, and a negative terminal of the first capacitor is grounded.

8. The power supply as claimed in claim 1, further comprising a second diode, wherein one end of the secondary inductance coil of the transformer is connected to the anode of the second diode, the cathode of the second diode is connected to a voltage output terminal via an inductance.

9. The power supply as claimed in claim 8, wherein the anode of the second diode is connected to the cathode of the second diode via a third capacitor and a fourth resistor connected in series.

10. The power supply as claimed in claim 8, further comprising a voltage regulating diode, wherein the other end of the secondary inductance coil of the transformer is connected to the anode of the voltage regulating diode, the cathode of the voltage regulating diode is connected to the voltage output terminal.

11. The power supply as claimed in claim 10, further comprising a fourth capacitor, a fifth resistor and a fifth capacitor, wherein the fourth capacitor is connected to between the cathode of the second diode and the anode of the voltage regulating diode, the voltage regulating diode is connected to the fifth resistor and the fifth capacitor in parallel.

12. A power supply for a computer, comprising:
   an alternating current (AC) power supply connected to a primary inductance coil of a transformer via a rectifier, a secondary inductance coil of the transformer providing a standby voltage;
   a pulse width modulation (PWM) controller comprising a voltage terminal, and a pulse terminal,
   a positive voltage terminal of the rectifier connected to the pulse terminal of the PWM controller via the primary inductance coil of the transformer;
   a relay comprising a switch and an inductance coil, the switch connected between the positive voltage terminal of the rectifier and the voltage terminal of the PWM controller, the inductance coil and a power switch connected in series between a battery and ground, wherein the power switch is controlled by powering on or off the computer;
   a light emitting diode (LED), a voltage source connected to the anode of the LED, the cathode of the LED grounded; and
   a photosensitive element in proximity to and facing the LED, a first terminal of the photosensitive element connected to a first terminal of the switch of the relay that is connected to the positive voltage terminal of the rectifier, a second terminal of the photosensitive element connected to the inductance coil of the relay.

* * * * *